US012650795B2

(12) United States Patent
Sugiyama et al.

(10) Patent No.: US 12,650,795 B2
(45) Date of Patent: Jun. 9, 2026

(54) MANAGEMENT SERVER, IMAGE FORMING APPARATUS, AND MANAGEMENT SERVER SYSTEM

(71) Applicant: SEIKO EPSON CORPORATION, Tokyo (JP)

(72) Inventors: Yuichi Sugiyama, Shiojiri (JP); Tsutomu Kasai, Shimosuwa-machi (JP); Tomohito Someya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 274 days.

(21) Appl. No.: 18/620,365

(22) Filed: Mar. 28, 2024

(65) Prior Publication Data

US 2024/0329897 A1    Oct. 3, 2024

(30) Foreign Application Priority Data

Mar. 30, 2023    (JP) ................................. 2023-055392

(51) Int. Cl.
| | |
|---|---|
| *G06F 3/12* | (2006.01) |
| *G06K 7/14* | (2006.01) |
| *H04L 9/40* | (2022.01) |

(52) U.S. Cl.
CPC .......... *G06F 3/1236* (2013.01); *G06F 3/1203* (2013.01); *G06F 3/121* (2013.01); *G06F 3/1234* (2013.01); *G06F 3/1238* (2013.01); *G06F 3/1288* (2013.01); *G06K 7/1417* (2013.01); *H04L 63/08* (2013.01); *G06F 3/129* (2013.01)

(58) Field of Classification Search
None
See application file for complete search history.

(56) References Cited

U.S. PATENT DOCUMENTS

| | | | | |
|---|---|---|---|---|
| 8,850,542 | B2 * | 9/2014 | Auger | ...................... G06K 5/00 |
| | | | | 726/7 |
| 2020/0192617 | A1 * | 6/2020 | Otsuka | .................. G06F 3/1258 |
| 2021/0303238 | A1 * | 9/2021 | Minamiyama | ....... B41J 2/17543 |
| 2022/0035581 | A1 | 2/2022 | Kawasaki | |
| 2022/0121407 | A1 * | 4/2022 | Arima | .................. G06F 3/1238 |
| 2022/0311879 | A1 * | 9/2022 | Renes | ..................... G06F 3/126 |

FOREIGN PATENT DOCUMENTS

JP            2022025667 A        2/2022

* cited by examiner

*Primary Examiner* — Haris Sabah
(74) *Attorney, Agent, or Firm* — CHIP LAW GROUP

(57) ABSTRACT

A server processing portion 120 establishes communication through a temporary connection with an image forming apparatus 10 (step S100). Further, the server processing portion 120 transmits, when a request of a main connection for connecting a service providing server 200 and the image forming apparatus 10 via a management server 100 is received from the service providing server 200, URL information for establishing communication through the main connection to the image forming apparatus 10 by using communication through the temporary connection (step S130). Further, the server processing portion 120 establishes communication through the main connection (step S140) when there is an access (step S320) from a terminal device 300 that reads code information formed by the image forming apparatus 10 based on the URL information.

12 Claims, 7 Drawing Sheets

FIG. 7

MANAGEMENT SERVER, IMAGE FORMING APPARATUS, AND MANAGEMENT SERVER SYSTEM

The present application is based on, and claims priority from JP Application Serial Number 2023-055392, filed Mar. 30, 2023, the disclosure of which is hereby incorporated by reference herein in its entirety.

BACKGROUND

1. Technical Field

The present disclosure relates to a management server, an image forming apparatus, a management server system, and the like.

2. Related Art

In the related art, a service system using a server connected to a network is known. JP-A-2022-025667 discloses a method of registering an image forming apparatus in a service system.

As the configurations of service systems, which are connected to image forming apparatuses, are diversified, the procedures from setting up an image forming apparatus to registering the image forming apparatus in a service system are burdensome for users. Therefore, the convenience of the service system is not sufficient.

SUMMARY

An aspect of the present disclosure relates to a management server including: a server communication portion communicating with an image forming apparatus and a service providing server; and a server processing portion, in which the server processing portion establishes communication through a temporary connection with the image forming apparatus, transmits, when a request of a main connection for connecting the service providing server and the image forming apparatus via a management server is received from the service providing server, URL information for establishing communication through the main connection to the image forming apparatus by using communication through the temporary connection, and establishes communication through the main connection when there is an access from a terminal device that reads code information formed by the image forming apparatus based on the URL information.

Further, another aspect of the present disclosure relates to an image forming apparatus including: a communication portion communicating with a management server that is communicatively connected to a service providing server; and a processing portion, in which the processing portion establishes communication through a temporary connection with the management server, and prints or displays, when URL information for establishing communication through a main connection for connecting the service providing server and the image forming apparatus via the management server is received from the management server by using communication through the temporary connection, code information including the URL information.

Further, still another aspect of the present disclosure relates to a management server system including: the management server described above; and the image forming apparatus.

BRIEF DESCRIPTION OF THE DRAWINGS

FIG. 7 is a flowchart illustrating an example of processing of a main connection process.

DESCRIPTION OF EMBODIMENTS

Hereinafter, the present embodiment will be described. It should be noted that the present embodiment described below does not unreasonably limit the content of the present disclosure described in the claims. Further, not all of the configurations described in the present embodiment are essential constituent requirements of the present disclosure.

Figure 1:
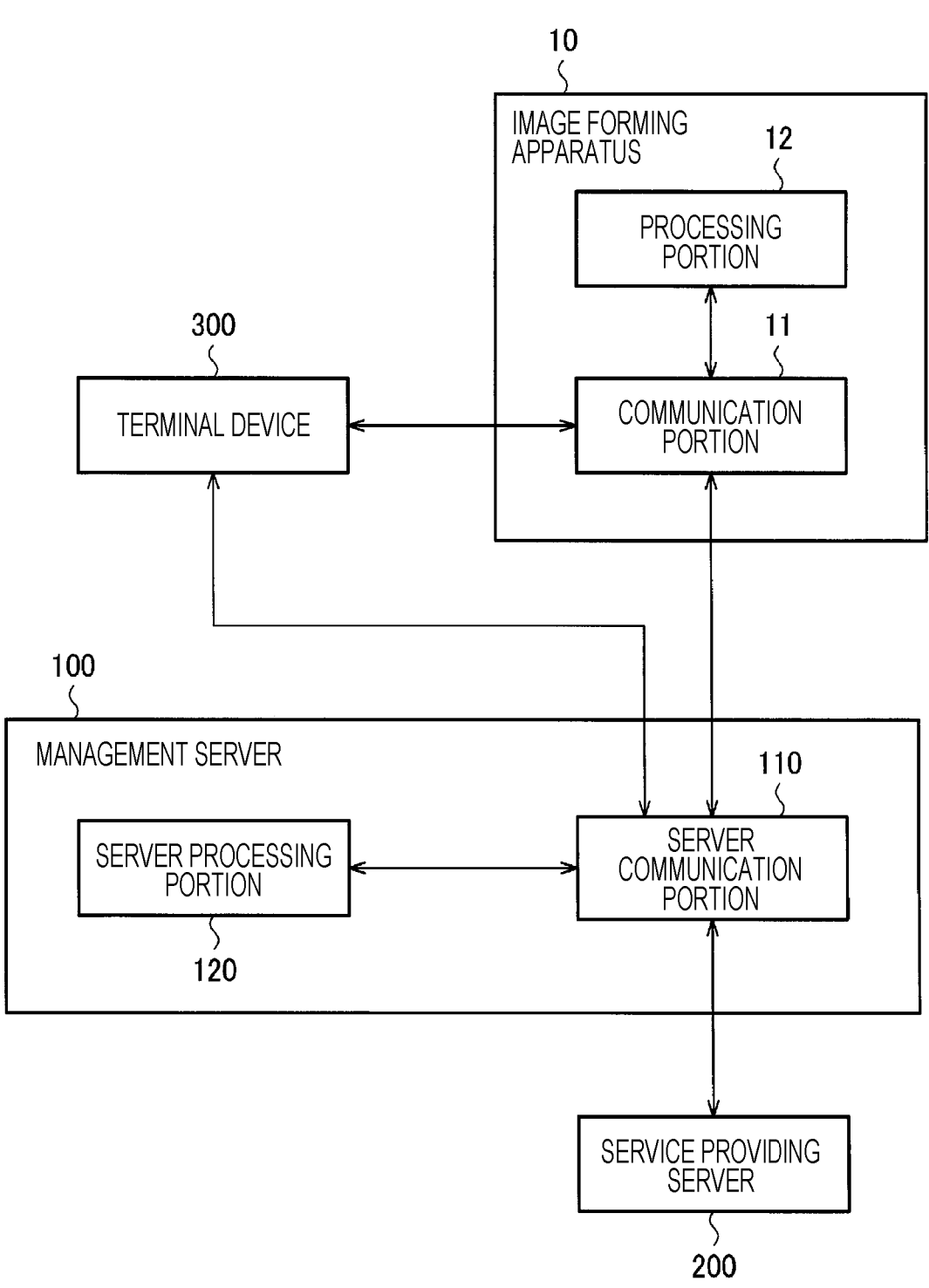
FIG. 1 is a diagram illustrating a configuration example of a management server system.

FIG. 1 is a block diagram illustrating a configuration example of a management server system 1 including a management server 100 of the present embodiment. The management server 100 of the present embodiment includes a server communication portion 110 and a server processing portion 120.

The server communication portion 110 is a communication interface that communicates with the image forming apparatus 10 and the service providing server 200 illustrated in FIG. 1 and that performs communication according to a predetermined communication standard. Further, the server communication portion 110 can also communicate with a terminal device 300, which will be described later. The server communication portion 110 can be implemented by, for example, communication hardware such as an application specific integrated circuit (ASIC) for communication or a communication processor, communication firmware, or the like. In the present embodiment, by the server processing portion 120, which will be described later, performing a communication control process such as a transmission process or a reception process of information on the server communication portion 110, the server communication portion 110 can transmit information to external apparatuses such as the image forming apparatus 10 and the service providing server 200 and can receive information from the external apparatuses. That is, the server communication portion 110 includes each of hardware, communication firmware, and the like corresponding to the desired wireless communication standard. The predetermined communication standard is wireless communication by, for example, Wi-Fi (registered trademark) or the like, and the server communication portion 110 performs wireless communication according to a predetermined connection mode of Wi-Fi. The predetermined connection mode is, for example, an infrastructure mode. That is, the management server 100 communicates with the image forming apparatus 10, the service providing server 200, and the terminal device 300 via an external access point (not illustrated). In the following description, the fact that the server processing portion 120 transmits and receives various types of data via the server communication portion 110 may be referred to as the fact that the server processing portion 120 simply transmits and receives various types of data, or the fact that the management server 100 transmits and receives various types of data.

The server processing portion 120 performs processing of each portion of the management server 100. The server processing portion 120 is configured with the following hardware. Although the hardware includes a circuit that processes digital signals, the hardware may further include a circuit that processes analog signals. For example, the hardware can consist of one or a plurality of circuit devices mounted on a circuit substrate or one or a plurality of circuit elements. The one or a plurality of circuit devices are, for example, integrated circuits (IC), field-programmable gate arrays (FPGAs), and the like. The one or a plurality of circuit elements are, for example, resistors, capacitors, and the like. Further, the server processing portion 120 is implemented by including at least one of the following processors. The server processing portion 120 includes a server memory that stores information (not illustrated in FIG. 1) and a processor that is operated based on the information stored in the server memory. The information includes, for example, a program and various data. The processor includes the hardware. As the processor, various processors, such as a central processing unit (CPU), a graphics processing unit (GPU), and a digital signal processor (DSP), can be used. The server memory may be a semiconductor memory such as a static random access memory (SRAM) or a dynamic random access memory (DRAM), may be a register, may be a magnetic storage device such as a hard disk drive (HDD), and may be an optical storage device such as an optical disk device. For example, the server memory stores commands that can be read by the computer, and by executing the commands with the processor, the functions of some or all of the portions of respective portions of the management server 100 are implemented as processing. Here, the command may be a command of a command set constituting the program or may be a command instructing an operation with respect to a hardware circuit of the processor.

Although the image forming apparatus 10 of the present embodiment is, for example, a printer, the image forming apparatus 10 may be a scanner, a personal computer, a wearable device, a biometric information measuring device, a robot, a video device, a physical quantity measuring device, or the like. The printer here may be an ink jet printer, for example, and may also be, for example, a dot impact printer, a thermal transfer printer, a laser printer, or a label printer. Further, the wearable device refers to a smartwatch, an active movement tracker, or the like. Further, the biometric information measuring device refers to a pulse rate, a pedometer, or the like. Further, the video device refers to a camera, a projector, or the like. Further, the physical quantity measuring device refers to a thermometer, a weighing scale, or the like. Further, the printer referred to here includes a multifunction device. The multifunction device refers to a printer including a function other than the printer function, and the function other than the printer function may be a copy function, a fax function, a scanner function, or the like, but other functions may be also possible.

The image forming apparatus 10 according to the present embodiment includes a communication portion 11 and a processing portion 12. The communication portion 11 is a communication interface that corresponds to the predetermined communication standard similar to the server communication portion 110 of the management server 100. That is, the communication portion 11 of the present embodiment includes each of hardware, communication firmware, and the like corresponding to the predetermined communication standard. The processing portion 12 is configured with the same processor as the server processing portion 120 of the management server 100 and functions as the image forming apparatus 10 by reading various programs from a memory (not illustrated) and performing an input/output process and the like. In the following description, the fact that the processing portion 12 transmits and receives various types of data via the communication portion 11 may be referred to as the fact that the processing portion 12 simply transmits and receives various types of data, or the fact that the image forming apparatus 10 transmits and receives various types of data. Further, although FIG. 1 illustrates that one management server 100 is connected to one image forming apparatus 10, a plurality of image forming apparatuses 10 may be connected to one management server 100.

Other components can be added to the image forming apparatus 10 according to the present embodiment. The other components are, for example, a printing portion, a display portion, or the like. Further, the image forming apparatus 10 may further include an operation portion, and the operation portion may be hardware integrated with the display portion with, for example, a touch panel. Either the printing portion or the display portion may be provided.

Although the terminal device 300 is, for example, a portable information terminal such as a smartphone, the terminal device 300 may be a personal computer or the like. Although not illustrated, the terminal device 300 includes a terminal device communication portion that is a communication interface corresponding to a predetermined communication standard similar to the server communication portion 110 and the communication portion 11, and communicates with the management server 100 and the image forming apparatus 10. Similarly, the terminal device 300 includes a terminal device processing portion implemented by the same processor as the server processing portion 120 and the processing portion 12, and controls each portion of the terminal device 300. Further, the terminal device 300 may further include, for example, a terminal device storage portion, a terminal device display portion, a terminal device operation portion, and the like, and the terminal device operation portion may be hardware integrated with the terminal device display portion with, for example, a touch panel. In the following description, the fact that the terminal device processing portion transmits and receives various types of data via the terminal device communication portion may be referred to as the fact that the terminal device 300 transmits and receives various types of data. Further, in the present embodiment, it is assumed that a user of the terminal device 300 is the same person as the user of the image forming apparatus 10 or a person who can view the same view as the user of the image forming apparatus 10. The person who can view the same view as the user of the image forming apparatus 10 is, for example, a person who works at a store to which the user of the image forming apparatus 10 belongs.

The service providing server 200 transmits and receives data related to a service of the image forming apparatus 10 to the management server 100. Specifically, for example, when the image forming apparatus 10 is a receipt printer, a POS system server, a printer maintenance service server, or the like corresponds to the service providing server 200. That is, a person who manages or operates the service providing server 200 is a service provider who provides a service related to the image forming apparatus 10. On the other hand, the user who uses the image forming apparatus 10 is a service recipient who receives a service related to the image forming apparatus 10. More specifically, for example, when the service providing server 200 is a POS system server, the service provider is a developer of the POS system, and the service recipient is a salesclerk of a store that has introduced the POS system. Further, in the present embodiment, a plurality of types of service providing servers 200 can be connected to one management server 100.

Although not illustrated, the service providing server 200 includes a communication interface corresponding to a predetermined communication standard similar to the server communication portion 110, and communicates with the management server 100. Similarly, the service providing server 200 includes a processor similar to the server processing portion 120, and controls each portion of the service providing server 200. Hereinafter, the fact that the processor of the service providing server 200 transmits and receives various types of data via the communication interface of the service providing server 200 is simply referred to as the fact that the service providing server 200 transmits and receives various types of data.

For example, it is assumed that a POS system service using the image forming apparatus 10 is developed by the service provider, and the service recipient uses the POS system service. In this case, the service provider incorporates a POS system service software into the image forming apparatus 10. The service provider can provide the POS system service to a store or the like by sending the image forming apparatus 10 incorporating the POS system service software to the service recipient.

Further, in the service using the image forming apparatus 10, a sales source of the image forming apparatus 10 may provide the service provider and the service recipient with a predetermined service related to the image forming apparatus 10. For example, the predetermined service is a service or the like for promptly preparing a replacement image forming apparatus 10 by quickly detecting the fact that the image forming apparatus 10 is no longer operating normally. Alternatively, when the management server 100 is a server consisting of cloud computing, various cloud services may be included in the predetermined service. In order to perform such a predetermined service, it is necessary to enable the management server 100 to collect predetermined data for the image forming apparatus 10. Therefore, in order to start using the image forming apparatus 10, the user of the image forming apparatus 10 is required to perform a procedure of permitting the management server 100 to collect predetermined data. When a permission is obtained from the user of the image forming apparatus 10, the predetermined service becomes usable.

As described above, since the management server 100 is a server that provides a predetermined service, a client server system relationship is established among the management server 100, the service providing server 200, and the image forming apparatus 10, in which the management server 100 is set as a server and the service providing server 200 and image forming apparatus 10 are set as clients. Therefore, in the present embodiment, the image forming apparatus 10 and the service providing server 200 are not directly connected to each other, and the management server 100 functions to relay data transmission and reception between the image forming apparatus 10 and the service providing server 200.

In the present embodiment, as illustrated in FIG. 1, the fact that the image forming apparatus 10 and the service providing server 200 are communicatively connected via the management server 100 is referred to as a main connection. For example, when it is desired to add an image forming apparatus 10 that is a target of the predetermined service, the server processing portion 120 performs processing of permitting an access from the corresponding image forming apparatus 10. When there are a plurality of the image forming apparatuses 10 and a plurality of the service providing servers 200 as clients, the association between each image forming apparatus 10 and each service providing server 200 is performed. As described above, in order to receive the predetermined service, it is necessary to perform a setting to make a main connection between the service providing server 200 and the image forming apparatus 10 via the management server 100.

However, as in the above-described POS system service, depending on the service provided by the service provider, the residence of the service provider and the residence of the service recipient may be different. In this case, there is a problem that the user of the image forming apparatus 10, who is the service recipient, has to set up the sent image forming apparatus 10. For example, it cannot be said that the service recipient is familiar with the method of setting up the image forming apparatus 10, which places a heavy burden on the service recipient. Further, for example, sending a service technician to the location of the service recipient to set up the image forming apparatus 10 is a heavy burden on the service provider side. As described above, the convenience of the developing service using the image forming apparatus 10 is not sufficient. The method of the present embodiment solves such a problem and improves the convenience of the service using the image forming apparatus 10. In the following description, the user of the image forming apparatus 10 and the terminal device 300 who is the service recipient may be simply referred to as a "user".

Figure 2:
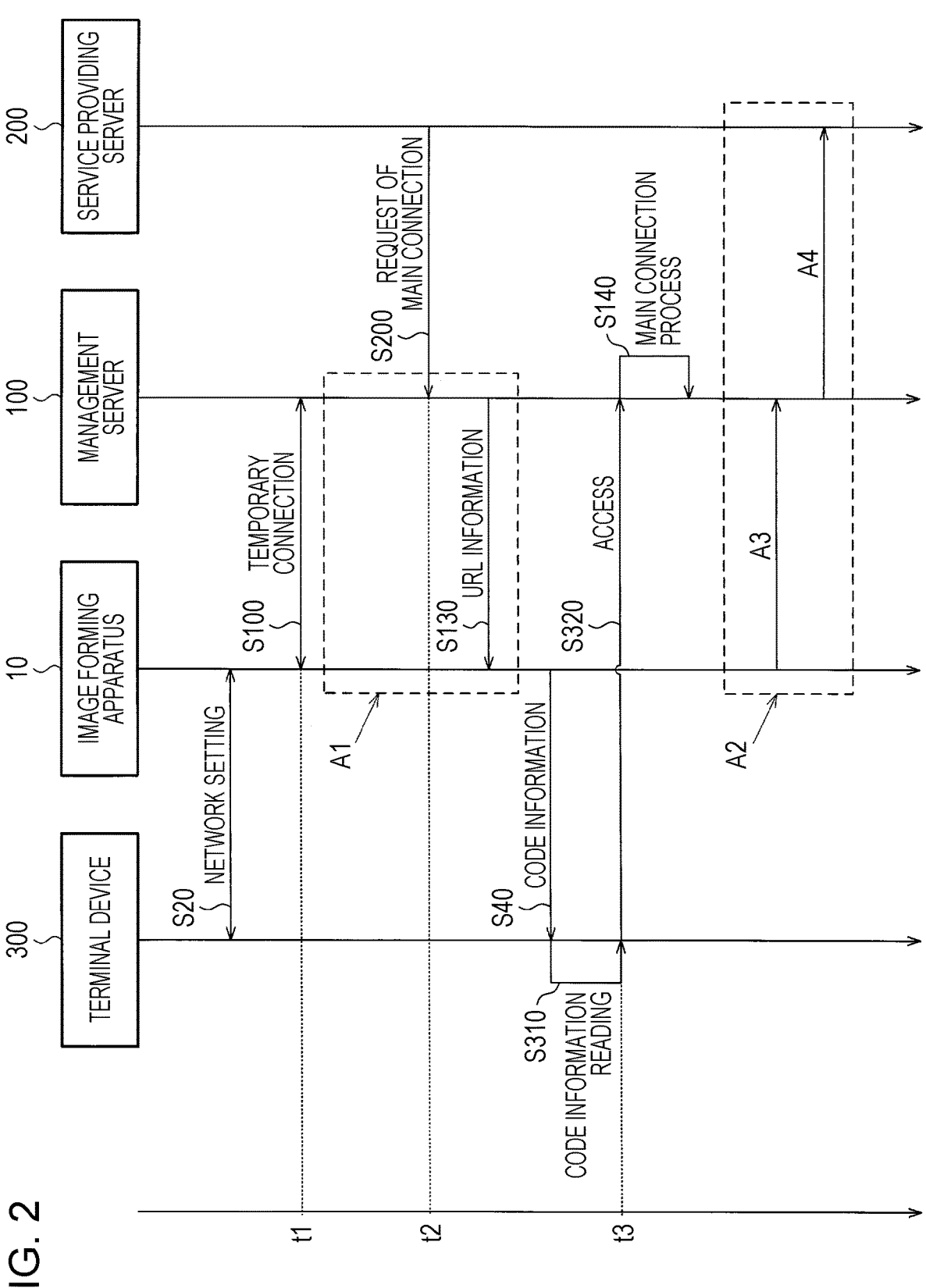
FIG. 2 is a diagram illustrating an example of a flow of processing of the present embodiment.

FIG. 2 is a diagram illustrating an example of a flow of processing according to the method of the present embodiment. In FIG. 2, although a downward arrow indicates a time axis, the length of the arrow does not indicate the specific length of time. Further, although not illustrated, it is assumed that the communication between the management server 100 and the service providing server 200 is already established. For example, a client server system may already be established between the management server 100 and the service providing server 200, or a predetermined session may be established between the management server 100 and the service providing server 200. The predetermined session is established by, for example, providing predetermined connection software to the service provider by a manufacturer of the image forming apparatus 10.

The user performs a network setting on the image forming apparatus 10 (step S20). Although step S20 in FIG. 2 is shown such that the image forming apparatus 10 and the terminal device 300 are connected for the convenience of description, the image forming apparatus 10 can also be connected to an external apparatus other than the terminal device 300. For example, as described above, the service provider sends the image forming apparatus 10 to the destination of the user in a packed state. In this case, authentication information for performing the main connection, which will be described later in step S320, may be sent from the service provider to the user. Specifically, for example, the service provider may send a paper sheet in which the authentication information for performing the main connection is written to the user by being packaged with the image forming apparatus 10. For example, the user establishes communication with the unpacked image forming apparatus 10 with, for example, an infrastructure mode of Wi-Fi, thereby the user can make a state in which communication is possible between the image forming apparatus 10 and the terminal device 300 and the like. Since many methods have been proposed for easily configuring the network settings of the image forming apparatus 10, the work related to step S20 does not place a large burden on the user. Further, the state where communication is possible between the image forming apparatus 10 and the terminal device 300 here means that network access is permitted between the image forming apparatus 10 and the terminal device 300.

Thereafter, the user performs a temporary connection (step S100) between the image forming apparatus 10 and the management server 100 at time t1. The temporary connection is a wireless communication connection temporarily established between the management server 100 and the image forming apparatus 10 in order to perform the above-described main connection. For example, a program module related to the temporary connection is sent to the user in a state of being incorporated in advance in the image forming apparatus 10 by the service provider. Although the details of step S100 will be described later, after the process of the temporary connection is started, it is automatically completed until the temporary connection is established. That is, performing the temporary connection (step S100) does not place a large burden on the user. When the temporary connection (step S100) is performed between a plurality of image forming apparatuses 10 and the management server 100, separate sessions exist between one image forming apparatus 10 and the management server 100.

Thereafter, at time t2, the server processing portion 120 receives a request of the main connection from the service provider via the service providing server 200 (step S200). In FIG. 2, although the time t2 is illustrated as being after the time t1, the time t1 may be time after the time t2. The server processing portion 120 executes step S130, which will be described later, on a condition that both step S100 and step S200 are performed. That is, at the time when step S100 is completed, the server processing portion 120 may execute step S130, which will be described later, and transmit URL information to the image forming apparatus 10, but this is not a problem. Further, the time t1 may be, for example, the time when step S20 is completed or may be optionally determined by the user, for example. That is, when the network setting of the image forming apparatus 10 is completed, the image forming apparatus 10 can automatically start the program for a temporary connection, and thus, the time when step S20 is completed can be set to the time t1. Alternatively, the user may be able to optionally determine the time t1 by starting the program for a temporary connection by the user operating an operation portion (not illustrated) of the image forming apparatus 10.

Thereafter, the server processing portion 120 transmits the URL information to the image forming apparatus 10 by using a session of the temporary connection, by using a method described later (step S130). That is, the dotted line frame of A1 in FIG. 2 conceptually indicates that it is a session of the temporary connection. The URL information is information corresponding to an IP address of the management server 100 which is used in step S320 described later.

The processing portion 12 creates code information based on the URL information received from the management server 100 in step S130 and outputs the code information (step S40). For example, the processing portion 12 functions as software for creating the code information from the URL information. The code information may be, for example, a one-dimensional code or a two-dimensional code. The two-dimensional code is a display type code that has information in the horizontal and vertical directions, for example, unlike a one-dimensional code that only has information in the horizontal direction. Further, the type of the two-dimensional code of the present embodiment may be a stack type or a matrix type, and is not particularly limited, and for example, a QR code (registered trademark) can be adopted. In the following description and illustration, the code information exemplifies a two-dimensional code.

Figure 3:
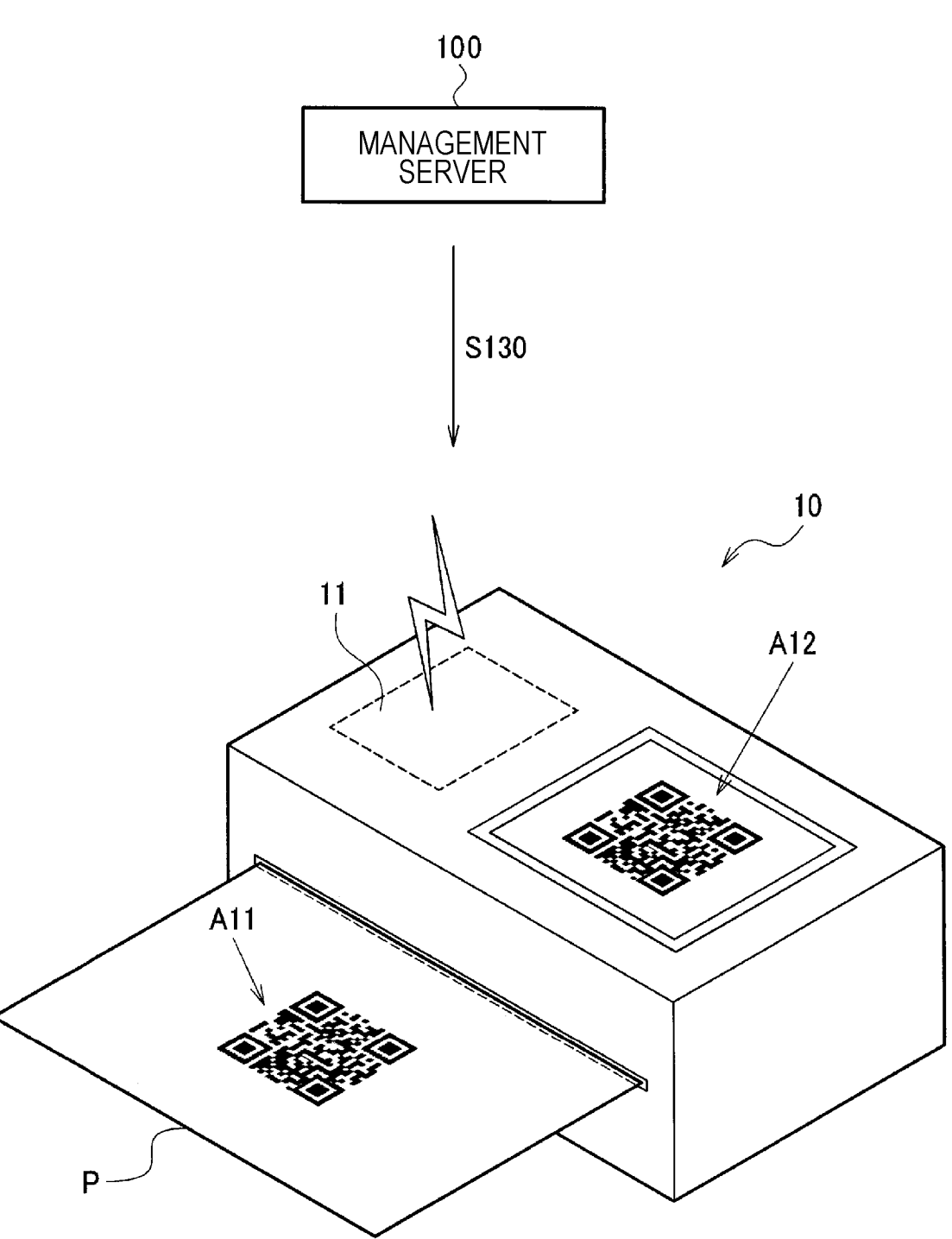
FIG. 3 is a diagram illustrating an example of displaying or printing code information.

Although step S40 shows an arrow pointing from the image forming apparatus 10 to the terminal device 300 for convenience, the code information may not need to be directly transmitted from the image forming apparatus 10 to the terminal device 300. For example, the processing portion 12 may implement step S40 by performing processing of displaying or printing the code information. More specifically, for example, as indicated by A11 in FIG. 3, a printing medium P on which the two-dimensional code is printed is ejected from the printing portion, and the two-dimensional code indicated by A12 is displayed on the display portion. The two-dimensional code indicated by A11 and the two-dimensional code indicated by A12 are the same two-dimensional code. Thereafter, step S40 can be implemented when the user reads any two-dimensional code by using a terminal device reading portion. Although FIG. 3 illustrates that the image forming apparatus 10 includes both the display portion and the printing portion, it is sufficient to have either the display portion or the printing portion, which may be determined as appropriate depending on the type of image forming apparatus 10. For example, when the image forming apparatus 10 is a receipt printer, it is sufficient that the printing medium P on which the two-dimensional code indicated by A11 is printed can be ejected.

In this way, the user is not involved in the processing of step S100, step S200, and step S130. In particular, when the network of the image forming apparatus 10 is set in step S20 and step S100 is executed, the user only has to wait for the code information to be displayed or printed in step S40 after the network for the image forming apparatus 10 is set in step S20.

The terminal device 300 reads the code information output in step S40 (step S310). More specifically, step S310 can be implemented when the user operates a terminal device image capturing portion (not illustrated) included in the terminal device 300 and images the code information. More specifically, an image of the two-dimensional code indicated by A21 is displayed on the terminal device display portion of the terminal device 300 as illustrated in an example of a screen of A20 in FIG. 4. The terminal device processing portion then controls a two-dimensional CCD scanner or the like to perform processing of restoring information based on the image of the two-dimensional code. As a result, the example of the screen of A20 is displayed, for example, as an example of a screen of A30. In the example of the screen of A30, an image including the URL information indicated by, for example, A31 is displayed. The URL information indicated by A31 is an example and does not indicate an actual group or the like. When the user performs an operation of selecting the image indicated by A30, a web page of the management server 100 is displayed as an example of a screen indicated by A40. By doing so, as illustrated in FIG. 2, at time t3, an access (step S320) from the terminal device 300 to the management server 100 is performed. That is, when the user selects an image including the URL information indicated by A31, the terminal device processing portion performs a process of requesting data of a predetermined web page from the management server 100 and performs a process of starting a web browser. The web browser performs a process of displaying the acquired page data of the web page. When the user inputs the authentication information written on the paper sheet packaged with the image forming apparatus 10 as necessary, on the screen indicated by A40, the management server 100 is permitted to collect predetermined data of the image forming apparatus 10.

Figure 4:
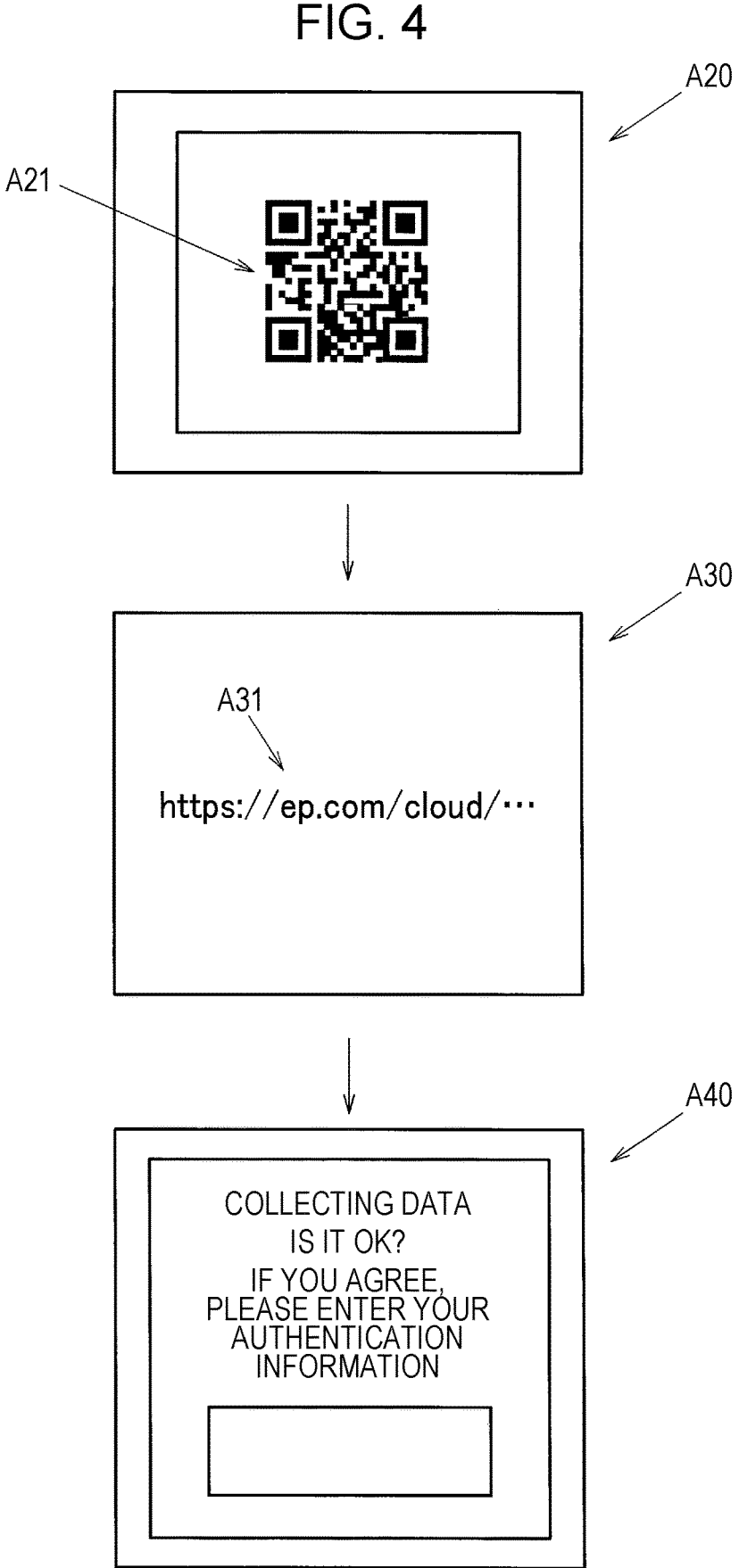
FIG. 4 is a diagram illustrating an example of a screen of a terminal device that reads the code information.

A40 in FIG. 4 is an example of a screen requesting the input of the authentication information, but the input of the authentication information can be omitted in the present embodiment. In that case, although not illustrated, when the user performs an operation of selecting the image of A30, for example, a web page indicating that the main connection is established may be displayed.

Thereafter, the management server 100 performs a main connection process (step S140). Although the details of step S140 will be described later with reference to FIG. 7, the server processing portion 120 performs the main connection for connecting the service providing server 200 and the image forming apparatus 10 via the management server 100 by checking permission from the user. That is, the client server system is established within a range indicated by A2. For example, the management server 100 as a server collects data indicated by A3 from the image forming apparatus 10 as a client. Thereafter, as indicated by A4, the management server 100 as a server transmits data similar to the data indicated by A3 to the service providing server 200 as a client.

As described above, the management server 100 of the present embodiment includes the server communication portion 110 communicating with the image forming apparatus 10 and the service providing server 200, and the server processing portion 120. The server processing portion 120 establishes communication through the temporary connection with the image forming apparatus 10 (step S100). Further, the server processing portion 120 transmits URL information for establishing communication through the main connection to the image forming apparatus 10 by using communication through the temporary connection (step S130) when a request of the main connection for connecting the service providing server 200 and the image forming apparatus 10 via the management server 100 is received from the service providing server 200. Further, the server processing portion 120 establishes communication through the main connection (step S140) when there is an access (step S320) from the terminal device 300 that reads the code information formed by the image forming apparatus 10 based on the URL information.

As described above, since the management server 100 of the present embodiment includes the server communication portion 110, the management server 100 can communicate with the image forming apparatus 10, the service providing server 200, and the terminal device 300. Further, since the management server 100 includes the server processing portion 120, it is possible to establish communication through the temporary connection with the image forming apparatus 10. By doing so, since a session due to the temporary connection is established between the management server 100 and the image forming apparatus 10, the URL information for establishing communication through the main connection can be transmitted from the management server 100 to the image forming apparatus 10. Further, since the main connection, which is for connecting the service providing server 200 and the image forming apparatus 10 via the management server 100, is established when there is an access based on the URL information transmitted from the terminal device 300, the main connection can be established without requiring advanced knowledge or work from the user who is the service recipient.

Until now, in services using the image forming apparatus 10, no method has been proposed for establishing a connection between the service providing server 200 and the image forming apparatus 10 via the management server 100 without requiring advanced knowledge and with a small number of procedures. In the present embodiment, through each process illustrated in FIG. 2, the minimum work that the user needs to do is to set up the network for the image forming apparatus 10 in step S20 and read the code information using the terminal device 300 in step S310 to select the screen of A30 in FIG. 4. As a result, the service recipient, who is not the service provider, can appropriately connect the image forming apparatus 10 and the service providing server 200 without requiring advanced knowledge.

Further, the method of the present embodiment may be implemented as the image forming apparatus 10. That is, the image forming apparatus 10 of the present embodiment includes the communication portion 11 communicating with the management server 100, which is communicatively connected to the service providing server 200, and the processing portion 12. The processing portion 12 establishes communication through the temporary connection with the management server 100 (step S100). Further, the processing portion 12 prints or displays the code information including the URL information (step S40) when the URL information for establishing communication through the main connection for connecting the service providing server 200 and the image forming apparatus 10 via the management server 100 is received from the management server 100 by using communication through the temporary connection (step S130). In this way, the same effect as described above can be obtained.

Further, the method of the present embodiment may be implemented as the management server system 1. That is, the management server system 1 of the present embodiment includes the management server 100 and the image forming apparatus 10. More specifically, in the management server system 1 of the present embodiment, the image forming apparatus 10 further includes the communication portion 11 communicating with the management server 100, which is communicatively connected to the service providing server 200, and the processing portion 12. The server processing portion 120 establishes communication through the temporary connection with the image forming apparatus 10 (step S100). Further, the server processing portion 120 transmits URL information for establishing communication through the main connection to the image forming apparatus 10 by using communication through the temporary connection (step S130) when a request of the main connection for connecting the service providing server 200 and the image forming apparatus 10 via the management server 100 is received (step S200) from the service providing server 200. Further, the processing portion 12 prints or displays the code information including the URL information (step S40) when the URL information is received from the management server 100 by using communication through the temporary connection. Further, the server processing portion 120 establishes communication through the main connection (step S140) when there is an access (step S320) from the terminal device 300 that reads the code information formed by the image forming apparatus 10 based on the URL information. In this way, the same effect as described above can be obtained.

Figure 5:
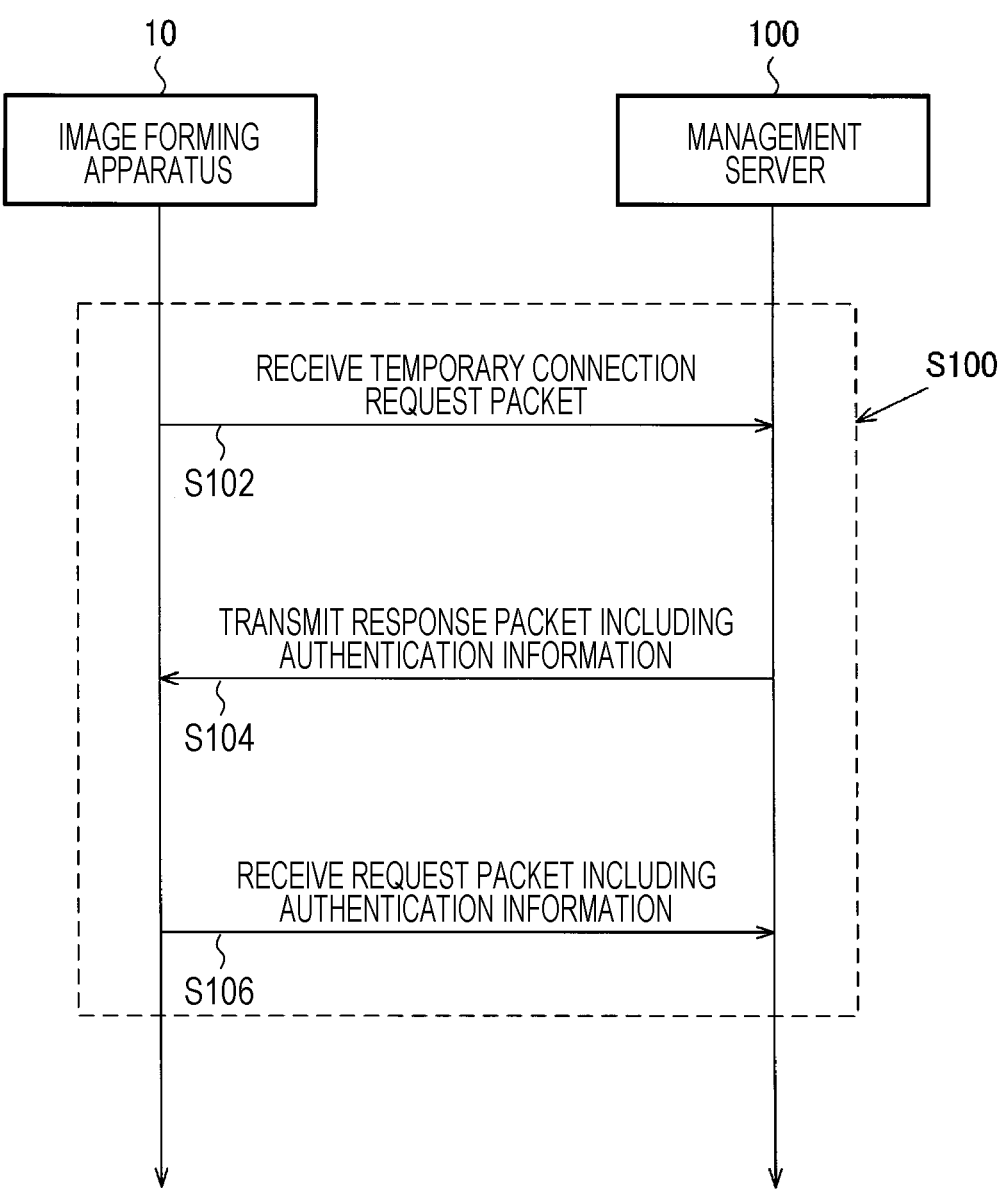
FIG. 5 is a diagram illustrating an example of a flow of a temporary connection process.

Next, the details of the temporary connection (step S100) will be described with reference to FIG. 5. The server processing portion 120 receives a temporary connection request packet from the image forming apparatus 10 (step S102). The server processing portion 120 transmits a response packet including the authentication information to the processing portion 12 (step S104). The authentication information here is authentication information required for the temporary connection. As a result, the processing portion 12 acquires the authentication information required for the temporary connection. Thereafter, the processing portion 12 transmits a request packet including the received authentication information (step S106). The server processing portion 120 establishes the temporary connection by using a communication method according to the temporary connection with the image forming apparatus 10 in which the request packet according to step S130 is transmitted, based on the received authentication information. As a result, the temporary connection is established between the image forming apparatus 10 and the management server 100. As described above, in the management server 100 of the present embodiment, the server processing portion 120 establishes communication through the temporary connection with the image forming apparatus 10, based on the authentication information for establishing communication through the temporary connection. By doing so, the server processing portion 120 can reliably perform the temporary connection with respect to the image forming apparatus 10 that requests the temporary connection with the management server 100. For example, there is a possibility that a request packet according to step S130 is transmitted to the management server 100 from the image forming apparatus 10 owned by a person other than the user. In this regard, by applying the method of the present embodiment, since the server processing portion 120 can determine that the request packet does not include the authentication information, it is possible to avoid an unintended temporary connection by processing such as discarding the request packet.

When step S102 is performed, step S104 and step S106 are automatically performed. Therefore, for example, when step S100 is performed at the time when the network setting (step S20) is completed, the temporary connection is established between the image forming apparatus 10 and the management server 100 without the user having to do anything. Alternatively, when the user starts the temporary connection (step S100) by operating a predetermined operation portion of the image forming apparatus 10, the temporary connection is automatically established between the image forming apparatus 10 and the management server 100 after the user operates the predetermined operation portion. Therefore, the burden on the user related to the temporary connection (step S100) is small.

Next, step S200 and step S130 will be explained in detail with reference to FIG. 6. As indicated by A51, the request packet according to step S200 contains the identification information of the image forming apparatus 10. The identification information of the image forming apparatus 10 here is, for example, a serial number of the image forming apparatus 10 desired to perform the main connection with the service providing server 200. That is, for example, the service provider sends the image forming apparatus 10 to the user as described above and records the serial number of the sent image forming apparatus 10. The process in which the server processing portion 120 receives the request packet including the serial number of the image forming apparatus 10 from the service providing server 200 corresponds to step S200. As described above, in the management server 100 of the present embodiment, the server processing portion 120 receives the identification information of the image forming apparatus 10 from the service providing server 200 as a request of the main connection. By doing so, the server processing portion 120 can specify the image forming apparatus 10 that transmits the URL information by using the temporary connection. For example, as described above, there is a possibility that the management server 100 is connected to a plurality of the service providing server 200, and similarly, there is a possibility that the management server 100 is connected to a plurality of image forming apparatuses 10. That is, there is a possibility that a plurality of sessions related to the above-mentioned temporary connection are established. In such a case, when step S200 is performed in such a case, the server processing portion 120 may not be able to determine which image forming apparatus 10 the service providing server 200 in step S200 is requesting for the main connection. In this regard, by applying the method of the present embodiment, the server processing portion 120 can specify the image forming apparatus 10 to be connected to the service providing server 200 based on the identification information of the image forming apparatus 10. As a result, a desired combination of service providing servers 200 and image forming apparatuses 10 can be connected via the management server 100. Hereinafter, the description will be made on the assumption that the identification information of the A51 is "ABC001".

Figure 6:
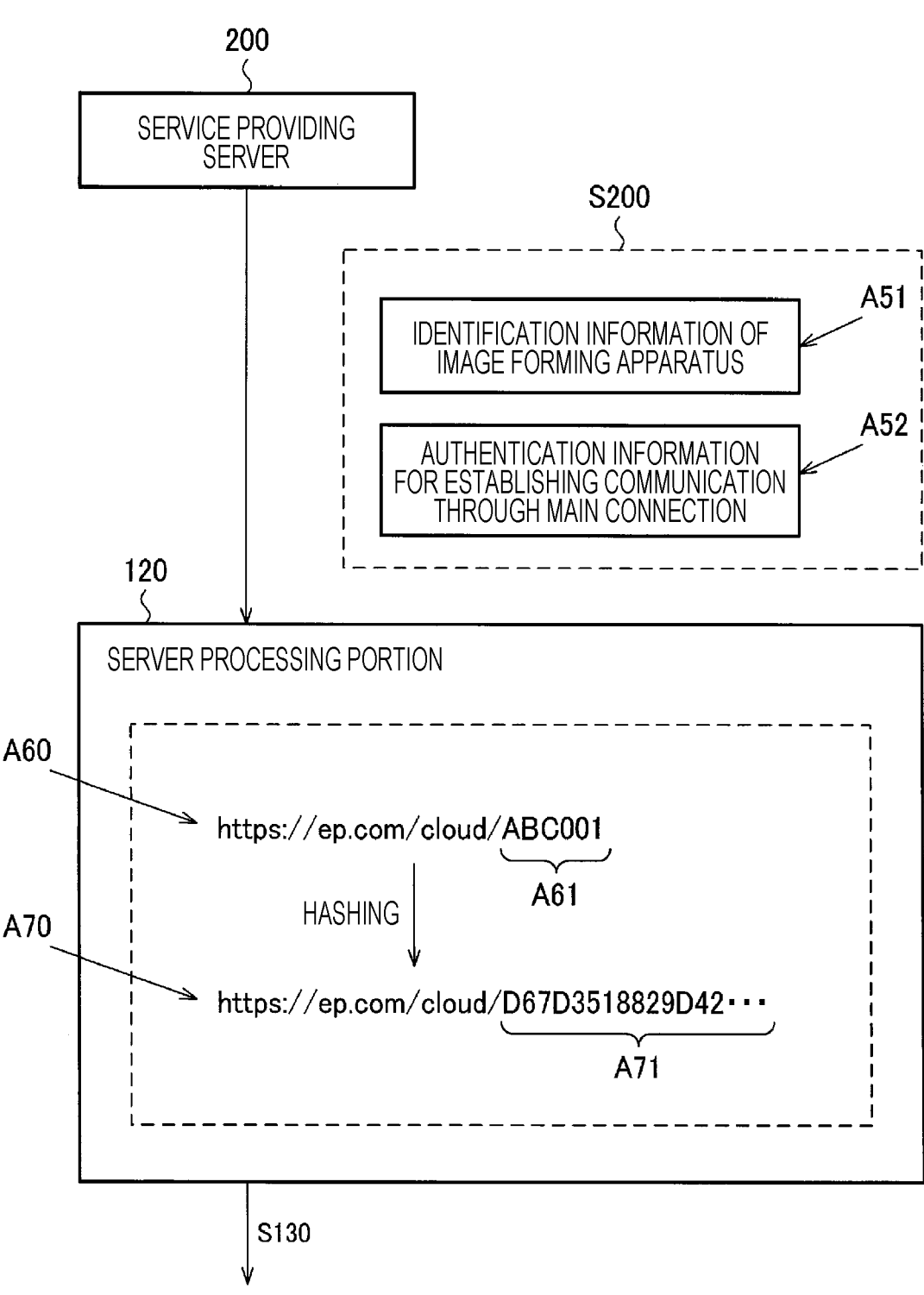
FIG. 6 is a diagram illustrating an example of hashing of URL information.

Further, as indicated by A52 in FIG. 6, the request packet according to step S200 may include the authentication information for establishing communication through the main connection. That is, the server processing portion 120 receives the authentication information for establishing communication through the main connection between the service providing server 200 and the image forming apparatus 10, from the service providing server 200 as a request of the main connection. By doing so, as will be described later, it is possible to prevent the main connection from being performed based on an access from a person other than the user.

Further, the URL information according to step S130 may include a hash value. For example, the server processing portion 120 performs a process of converting the URL information indicated by A60 into the URL information indicated by A70 by using the following method. The URL information indicated by A60 includes path information indicated by A61. The path information indicated by A61 is based on the identification information of the image forming apparatus 10. That is, the server processing portion 120 associates the identification information of the image forming apparatus 10 received in step S200 with a predetermined area of the server memory (not illustrated) of the management server 100. The server processing portion 120 converts the path information indicated by A61 into path information indicated by A71 by performing hashing with a predetermined hash function and generates the URL information indicated by A70 based on the path information.

When the server processing portion 120 performs the above process, although the path information, which is included in the URL information, is changed, a host name is not changed. Therefore, in step S320, an IP address acquired from a DNS server (not illustrated) by the terminal device processing portion is not changed. In other words, regardless of whether the URL information of A60 or the URL information of A70 is used, the terminal device 300 can access the same management server 100 through step S320 described later.

Further, the hash value indicated by A71 may be hashed into a character string, which is obtained by combining the identification information indicated by A61 and a random number (not illustrated) generated by the server processing portion 120, by using a predetermined hash function. Further, in addition to the identification information and the random number, for example, it may be hashed into a character string, which is obtained by combining the identification information related to the service provider, the identification information of the user, and the like, by using the predetermined hash function. Although the same hash value is generated when the same identification information is hashed by using the same hash function, it is possible to generate hash values in a greater variety of ways by appropriately combining the identification information with the random number, or the like. As a result, it is more difficult for a person other than the user to predict the hash value.

Further, for example, a table including a plurality of types of character strings corresponding to the hash value indicated in A71 may be stored in advance in the server memory (not illustrated). In step S130, the server processing portion 120 may randomly select one character string from the table and associate the selected character string, the identification information of the image forming apparatus 10, the address of the web page, or the like. Therefore, in the management server 100 of the present embodiment, the server processing portion 120 transmits the URL information including the hash value to the image forming apparatus 10 by using communication through the temporary connection. By doing so, the server processing portion 120 can transmit the URL information, which is difficult to predict by a person other than the user, to the image forming apparatus 10. For example, since the identification information of the image forming apparatus 10 indicated by A61 is a character string that can be predicted, there is a possibility that the URL information indicated by A60 is also predicted by a person other than the user. In this regard, by applying the method of the present embodiment, it is possible to transmit the URL information including the hash value indicated by A71 to the image forming apparatus 10. As a result, it is possible to further reduce the possibility that the URL information is predicted by a person other than the user. As a result, as will be described later, it is possible to further reduce the possibility that access to the management server 100 from the terminal device 300 owned by a person other than the user is permitted.

Figure 7:
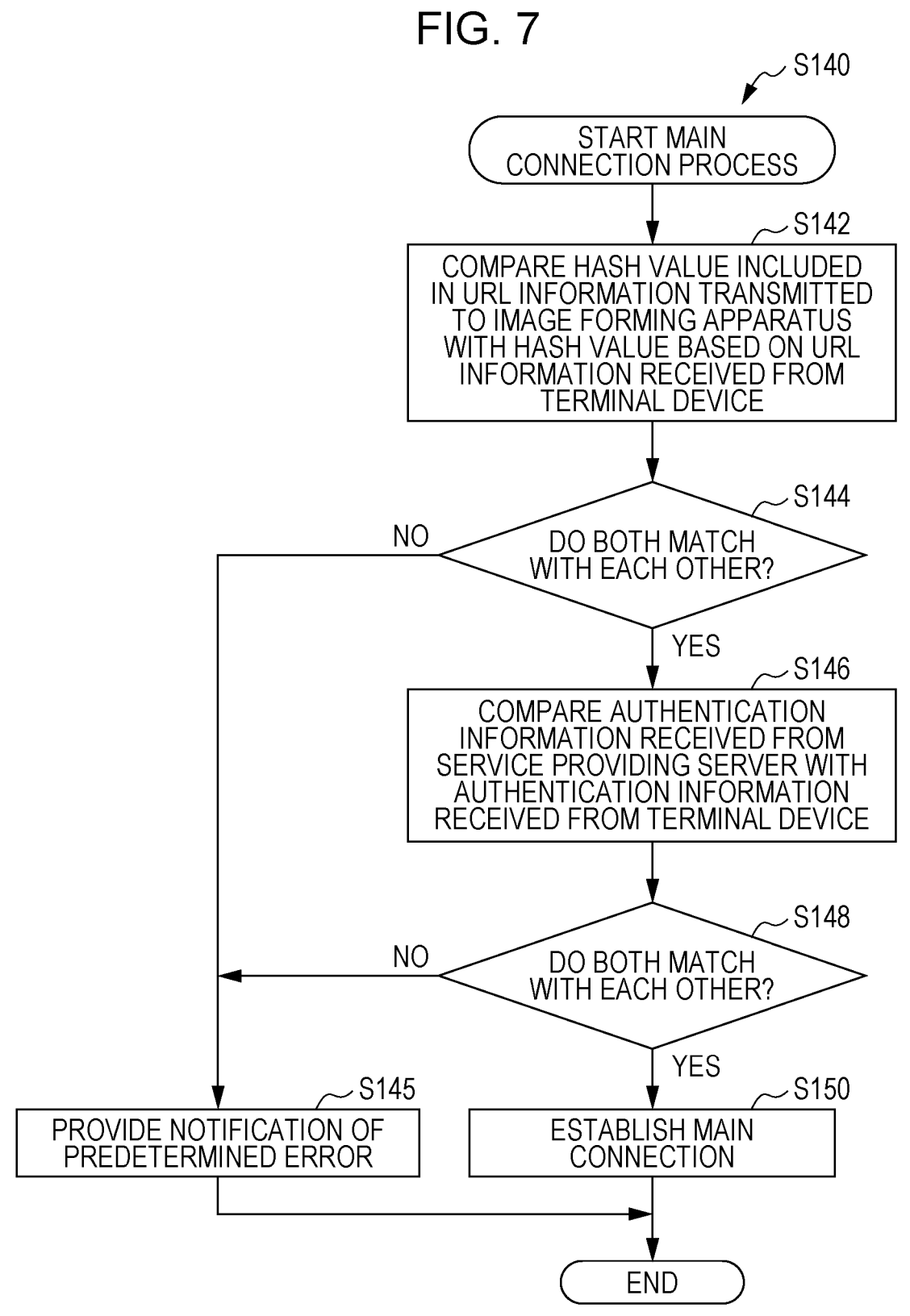

The main connection process (step S140) will be described in detail with reference to FIG. 7. When the authentication information for performing the main connection indicated by A52 in FIG. 6 is not included in the request packet of step S200, step S146 and step S148, which will be described later, can be omitted. First, the server processing portion 120 compares the hash value included in the URL information transmitted to the image forming apparatus 10 with the hash value included in the URL information based on the access from the terminal device 300 (Step S142). By doing so, it is possible to further reduce the possibility that the server processing portion 120 permits an access based on the terminal device 300 owned by a person other than the user. When a person other than the user predicts the URL information and accesses the management server 100, the possibility that the hash value according to the URL information is predicted is extremely low.

The server processing portion 120 provides a notification of a predetermined error (step S145) when the hash value included in the URL information transmitted to the image forming apparatus 10 and the hash value included in the URL information based on the access from the terminal device 300 do not match with each other (NO in step S144). By doing so, the management server system 1 can be built in which prompt notification is provided that an access based on a person other than the user has occurred. Although step S145 is a process of displaying an error on the terminal device display portion, step S145 is not limited to this, and for example, may be a process of notifying the manufacturer, service provider, user, or the like of the image forming apparatus 10 of the occurrence of an access from a person other than the user by email or the like, which is determined as appropriate. In the description of step S144 in FIG. 7, the hash value included in the URL information transmitted to the image forming apparatus 10 and the hash value included in the URL information based on the access from the terminal device 300 are referred to as "both" for convenience.

The server processing portion 120 may not receive a re-access from the terminal device 300 for a predetermined period when the hash value included in the URL information transmitted to the image forming apparatus 10 and the hash value included in the URL information based on the access from the terminal device 300 do not match with each other (NO in step S144). By doing so, the management server system 1 can be built in which an access from the terminal device 300 that is likely to be owned by a person other than the user is not received. Further, there is no limit to the predetermined period, which may be an indefinite period. In other words, the server processing portion 120 may reject the re-access from the terminal device 300, which is related to the process for which it is determined to be NO in step S144, indefinitely thereafter.

On the other hand, the server processing portion 120 compares the authentication information received from the service providing server 200 with the authentication information received from the terminal device 300 (step S146) when the hash value included in the URL information transmitted to the image forming apparatus 10 and the hash value included in the URL information based on the access from the terminal device 300 match with each other (YES in step S144). For example, when the server processing portion 120 determines YES in step S144, the server processing portion 120 permits the access from the terminal device 300 in step S320. As a result, the screen indicated by A40 in FIG. 4 is displayed, for example, on the terminal device display portion. The user transmits the authentication information to the server processing portion 120 by, for example, inputting the authentication information written on the paper sheet packaged with the image forming apparatus 10. The server processing portion 120 compares the authentication information transmitted using the screen indicated by A40 in FIG. 4 with the authentication information, which is stored in the server memory (not illustrated) and included in the request packet in step S200.

The server processing portion 120 establishes the main connection (step S150) when it is determined that the authentication information received from the service providing server 200 and the authentication information received from the terminal device 300 match with each other (YES in step S148). In the description of step S148 in FIG. 7, the authentication information received from the service providing server 200 and the authentication information received from the terminal device 300 are referred to as "both" for convenience. In step S150, the server processing portion 120 connects the service providing server 200 according to step S200 and the image forming apparatus 10 according to step S130 via the management server 100. As described above, in the management server 100 of the present embodiment, the server processing portion 120 establishes communication through the main connection when the authentication information is received from the terminal device 300 after the authentication information is received from the service providing server 200. By doing so, it is possible to more reliably prevent the main connection from being performed based on an access from a person other than the user.

On the other hand, the server processing portion 120 provides a notification of the predetermined error (step S145) when it is determined that the authentication information received from the service providing server 200 and the authentication information received from the terminal device 300 do not match with each other (NO in step S148). For example, the server processing portion 120 transmits, to the terminal device 300, a command or the like for displaying a web page including a display in which the authentication information is not correct.

Further, although not illustrated in the flowchart, the server processing portion 120 may not receive the access, for example, when there is an access in step S320 after a certain period of time has elapsed from the time when step S130 is performed. For example, although there is a case where the code information is printed on the printing medium P in step S40, when the printing medium P is taken away by a person other than the user, there is a possibility that step S320 is performed by the terminal device 300 of the person other than the user. In this regard, by providing a validity period in the code information issued in step S40, it is possible to prevent an unintended access from the terminal device 300 owned by a person other than the user.

As described above, the management server of the present embodiment includes the server communication portion communicating with the image forming apparatus and the service providing server, and the server processing portion. The server processing portion establishes communication through the temporary connection with the image forming apparatus. Further, the server processing portion transmits URL information for establishing communication through the main connection to the image forming apparatus by using communication through the temporary connection when a request of the main connection for connecting the service providing server and the image forming apparatus via the management server is received from the service providing server. Further, the server processing portion establishes communication through the main connection when there is an access from the terminal device that reads the code information formed by the image forming apparatus based on the URL information.

By doing so, since a session due to the temporary connection is established between the management server and the image forming apparatus, the URL information for establishing communication through the main connection can be transmitted from the management server to the image forming apparatus. Further, since the main connection, which is for connecting the service providing server and the image forming apparatus via the management server, is established when there is an access based on the URL information transmitted from the terminal device, the main connection can be established without requiring advanced knowledge, work, or the like from the service recipient.

The server processing portion may establish communication through the temporary connection with the image forming apparatus, based on the authentication information for establishing communication through the temporary connection.

By doing so, the server processing portion can reliably perform the temporary connection with respect to the image forming apparatus that requests the temporary connection with the management server.

The server processing portion may receive the identification information of the image forming apparatus from the service providing server as a request of the main connection.

By doing so, the server processing portion can specify the image forming apparatus that transmits the URL information by using the temporary connection.

The server processing portion may receive the authentication information for establishing communication through the main connection between the service providing server and the image forming apparatus, from the service providing server as a request of the main connection.

By doing so, it is possible to prevent the main connection from being performed based on an access from a person other than the user.

The server processing portion may establish communication through the main connection when the authentication information is received from the terminal device after the authentication information is received from the service providing server.

By doing so, it is possible to more reliably prevent the main connection from being performed based on an access from a person other than the user.

The server processing portion may transmit the URL information including the hash value to the image forming apparatus by using communication through the temporary connection.

By doing so, the server processing portion can transmit the URL information, which is difficult to predict by a person other than the user, to the image forming apparatus.

The server processing portion may compare the hash value included in the URL information transmitted to the image forming apparatus with the hash value included in the URL information based on the access from the terminal device.

By doing so, it is possible to further reduce the possibility that the server processing portion permits an access based on the terminal device owned by a person other than the user.

The server processing portion may provide a notification of a predetermined error when the hash value included in the URL information transmitted to the image forming apparatus and the hash value included in the URL information based on the access from the terminal device do not match with each other.

By doing so, the management server system can be built in which prompt notification is provided that an access based on a person other than the user has occurred.

The server processing portion may not receive a re-access from the terminal device for a predetermined period when the hash value included in the URL information transmitted to the image forming apparatus and the hash value included in the URL information based on the access from the terminal device do not match with each other.

By doing so, the management server system can be built in which an access from the terminal device that is likely to be owned by a person other than the user is not received.

Further, the image forming apparatus of the present embodiment includes the communication portion communicating with the management server, which is communicatively connected to the service providing server, and the processing portion. Further, the processing portion establishes communication through the temporary connection with the management server and prints or displays the code information including the URL information when the URL information for establishing communication through the main connection for connecting the service providing server and the image forming apparatus via the management server is received from the management server by using communication through the temporary connection.

Further, the management server system of the present embodiment includes the management server and the image forming apparatus.

Further, in the management server system of the present embodiment, the image forming apparatus may further include the communication portion communicating with the management server, which is communicatively connected to the service providing server, and the processing portion. Further, the server processing portion may establish communication through the temporary connection with the image forming apparatus. Further, the server processing portion may transmit the URL information for establishing communication through the main connection to the image forming apparatus by using communication through the temporary connection when a request of the main connection for connecting the service providing server and the image forming apparatus via the management server is received from the service providing server. Further, the processing portion may print or display the code information including the URL information when the URL information is received from the management server by using communication through the temporary connection. Further, the server processing portion may establish communication through the main connection when there is an access from the terminal device that reads the code information formed by the image forming apparatus based on the URL information.

Although the present embodiment is described in detail as described above, a person skilled in the art can easily understand that many modifications that do not substantially depart from the new matters and effects of the present embodiment are possible. Therefore, all such modification examples fall within the scope of the present disclosure. For example, a term described at least once together with a different term having a broader meaning or the same meaning in the specification or the drawings can be replaced with the different term anywhere in the specification or the drawings. All combinations of the present embodiment and modification examples also fall within the scope of the present disclosure. Further, the configuration and operation of the management server, the image forming apparatus, the management server system, and the like, are not limited to those described in the present embodiment, and various modification embodiments could be made.

What is claimed is:

1. A management server comprising:
a server communication portion communicating with an image forming apparatus and a service providing server; and
a server processing portion, wherein
the server processing portion
establishes communication through a temporary connection with the image forming apparatus,
transmits, when a request of a main connection for connecting the service providing server and the image forming apparatus via the management server is received from the service providing server, URL information for establishing communication through the main connection to the image forming apparatus by using communication through the temporary connection, and
establishes communication through the main connection when there is an access from a terminal device that reads code information formed by the image forming apparatus based on the URL information.

2. The management server according to claim 1, wherein the server processing portion establishes communication through the temporary connection with the image forming apparatus based on authentication information for establishing communication through the temporary connection.

3. The management server according to claim 1, wherein the server processing portion receives identification information of the image forming apparatus from the service providing server as the request of the main connection.

4. The management server according to claim 1, wherein the server processing portion receives authentication information for establishing communication through the main connection between the service providing server and the image forming apparatus from the service providing server as the request of the main connection.

5. The management server according to claim 4, wherein the server processing portion establishes communication through the main connection when the authentication information is received from the terminal device after the authentication information is received from the service providing server.

6. The management server according to claim 1, wherein the server processing portion transmits the URL information including a hash value to the image forming apparatus by using communication through the temporary connection.

7. The management server according to claim 6, wherein the server processing portion compares the hash value included in the URL information transmitted to the image forming apparatus with a hash value included in the URL information based on the access from the terminal device.

8. The management server according to claim 6, wherein the server processing portion provides a notification of a predetermined error when the hash value included in the URL information transmitted to the image forming apparatus and a hash value included in the URL information based on the access from the terminal device do not match with each other.

9. The management server according to claim 6, wherein the server processing portion does not receive a re-access from the terminal device for a predetermined period when the hash value included in the URL information transmitted to the image forming apparatus and a hash value included in the URL information based on the access from the terminal device do not match with each other.

10. A management server system comprising:
the management server according to claim 1; and
the image forming apparatus.

11. The management server system according to claim 10, wherein
the image forming apparatus includes
a communication portion communicating with the management server that is communicatively connected to the service providing server, and
a processing portion,
the server processing portion
establishes communication through the temporary connection with the image forming apparatus, and
transmits, when the request of the main connection for connecting the service providing server and the image forming apparatus via the management server is received from the service providing server, the URL information for establishing communication through the main connection to the image forming apparatus by using communication through the temporary connection, the processing portion prints or displays the code information including the URL information when the URL information is received from the management server by using communication through the temporary connection, and the server processing portion establishes communication through the main connection when there is an access from the terminal device that reads the code information formed by the image forming apparatus based on the URL information.

12. An image forming apparatus comprising:

a communication portion communicating with a management server that is communicatively connected to a service providing server; and a processing portion, wherein the processing portion establishes communication through a temporary connection with the management server, and prints or displays, when URL information for establishing communication through a main connection for connecting the service providing server and the image forming apparatus via the management server is received from the management server by using communication through the temporary connection, code information including the URL information.

\* \* \* \* \*